United States Patent
Ong (10) Patent No.: US 7,418,655 B2
(45) Date of Patent: *Aug. 26, 2008

(54) METHOD AND APPARATUS FOR PERSISTENT STORAGE OF WEB RESOURCES

(75) Inventor: Ping-Wen Ong, Middletown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 453 days.

This patent is subject to a terminal disclaimer.

(21) Appl. No.: 11/014,342

(22) Filed: Dec. 16, 2004

(65) Prior Publication Data

US 2005/0108626 A1 May 19, 2005

Related U.S. Application Data

(63) Continuation of application No. 09/201,752, filed on Dec. 1, 1998, now abandoned.

(51) Int. Cl.
*G06F 17/00* (2006.01)
(52) U.S. Cl. .................. 715/229; 715/234; 715/205; 715/255
(58) Field of Classification Search .......... 715/529, 715/513, 530, 531, 500, 234, 200, 299, 255, 715/256, 205; 703/3
See application file for complete search history.

(56) References Cited

U.S. PATENT DOCUMENTS

| | | |
|---|---|---|
| 5,418,946 A | 5/1995 | Mori |
| 5,504,879 A | 4/1996 | Eisenbert et al. |
| 5,627,936 A | 5/1997 | Prasad et al. |
| 5,634,052 A | 5/1997 | Morris |
| 5,790,848 A | 8/1998 | Wlaschin |
| 5,794,233 A | 8/1998 | Rubinstein |
| 5,832,224 A | 11/1998 | Fehskens et al. |
| 5,832,225 A | 11/1998 | Hacherl et al. .............. 709/223 |
| 5,832,520 A | 11/1998 | Miller |
| 5,855,015 A | 12/1998 | Shoham |
| 5,913,033 A | 6/1999 | Grout |

(Continued)

OTHER PUBLICATIONS

Simonson et al., "Version Augmented URIs for Reference Permanence via an Apache Module Design," Computer Networks and ISDN Systems, vol. 30, No. 1-7, 337-345 (Apr. 1998).

(Continued)

*Primary Examiner*—Thu Huynh (57) ABSTRACT

A method and apparatus are disclosed for providing persistent storage of Web resources. Uniform Resource Locators ("URLs") that identify Web resources are augmented to include a time stamp. A web browser and a web server are disclosed that accommodate a time stamp parameter and allow a user to refer to any Web address with a precise target date. The disclosed Web browser can optionally include a mechanism to facilitate the specification of the desired date and time, or the user can manually append the time stamp to the URL indicated in the "Location" window of the browser. The persistent Web servers (i) receive URLs containing a time stamp, (ii) extract the time stamp, (iii) retrieve the correct Web page from the archive, (iv) modify the requested Web page to update embedded hyperlinks to incorporate the same time stamp as the requested Web page and (v) return the requested page to the client. The persistent Web servers include a persistent archive for storing all of the versions of Web resources that will be persistently available to Web users.

25 Claims, 5 Drawing Sheets

U.S. PATENT DOCUMENTS

| | | | | |
|---|---|---|---|---|
| 5,978,828 | A | 11/1999 | Greer et al. | 709/224 |
| 5,978,847 | A | 11/1999 | Kisor et al. | |
| 5,991,773 | A | 11/1999 | Tagawa | |
| 5,991,802 | A | 11/1999 | Allard et al. | |
| 6,006,227 | A | 12/1999 | Freeman et al. | |
| 6,052,730 | A | 4/2000 | Felciano et al. | |
| 6,088,707 | A | 7/2000 | Bates et al. | |
| 6,108,637 | A | 8/2000 | Blumenau | |
| 6,108,703 | A | 8/2000 | Leighton et al. | |
| 6,115,035 | A | 9/2000 | Compton et al. | |
| 6,125,371 | A | 9/2000 | Bohannon et al. | |
| 6,169,997 | B1 | 1/2001 | Papierniak et al. | |
| 6,170,013 | B1 | 1/2001 | Murata | |
| 6,209,090 | B1 | 3/2001 | Aisenberg et al. | |
| 6,256,627 | B1 | 7/2001 | Beattie et al. | |
| 6,327,584 | B1 | 12/2001 | Xian et al. | |
| 6,366,933 | B1 | 4/2002 | Ball et al. | |
| 6,374,266 | B1 | 4/2002 | Shnelvar | |
| 7,120,862 | B1 * | 10/2006 | Ong | 715/511 |

OTHER PUBLICATIONS

Simonson et al., "Version Augmented URIs for Reference Permanencevia an Apache Module Design," Computer Networks and ISDN Systems, North Holland Publishing, Amsterdam, NL, vol. 30, No. 1-7, pp. 337-345 (Apr. 1998).

"Information Retrieval and Presentation Apparatus with Version Control," IBM Technical Disclosure Bulletin, IBM Corp. New York, US, vol. 41, No. 1, pp. 711-712 (Jan. 1998).

Kahle et al., "Preserving the Internet," Scientific American Inc., New York, US, pp. 72-73 (Mar. 1997).

Shafer et al., "Introduction to Persistent Uniform Resource Locators," Internet Citation (Jun. 1996).

"Building a Digital Library for the Future," printout which is surfed using http://www.archive.org, published Jan. 26, 1997, pp. 1-21.

Kahle, "Archiving the Internet," that is printed from "Archiving the Net," embedded hyperlink in Archive97 for more information about Archive97 phisolophy, issue Nov. 1996, pp. 1-8.

"Welcome to the Libertarian Web!," printout which is surfed using http://www.archive.org, published Nov. 9, 1996, pp. 1-11.

Plan 9 FAQ, Bell Labs and Toronto University, downloaded from http://www.ecf.toronto.edu/plan9/plan9faq.html (1995).

Plan 9, Bell Labs, Lucent Technologies, Inc., downloaded from http://cm.bell-labs.com/plan9 (1998).

Keith Shafer et al., "Introduction to Persistent Uniform Resource Locators," downloaded from http://purl.oclc.org/OCLC/PURL/INET96 (1996).

K. Sollins, "Architectural Principles of Uniform Resource Name Resolution," RFC2276, downloaded from http://www.cis.ohio-state.edu/htbin/rfc/rfc2276.html ( Jan. 1998).

Uniform Resource Names, Los Alamos National Laboratory, downloaded from http://www.acl.lanl.gov/URN (Aug. 1996).

"Uniform Resource Names: A progress Report," D-Lib Magazine (Feb. 1996).

K. Sollins and L. Masinter, "Functional Requirements for Uniform Resource Names," RFC1737, downloaded from http://www.cis.ohio-state.edu/htbin/rfc/rfc1737.html (Dec. 1994).

Stuart Weibel et al., "PURLs: Persistent Uniform Resource Locators," downloaded from http://purl.oclc.org/OCLC/PURL/SUMMARY (downloaded on Feb. 22, 1999).

Simonson et al., "Version Augmented URLs for Reference Permanence via an Apache Module Design," Computer Networks and ISDN Systems, vol. 30, No. 1-7, 337-345 (Apr. 1998).

"Building a Digital Library for the Future," available at http://www.archive.org, pp. 1-21 (Jan. 26, 1997).

Kahle, Brewster, "Archiving the Internet," available at http://www.archive.org, pp. 1-8 (Nov. 4, 1996).

"Welcome to the Libertarian Web!" available at http://www.archive.org, pp. 1-11 (Nov. 9, 1996).

* cited by examiner

| URL | STARTING DATE | ENDING DATE | IP ADDRESS | REDIRECTED URL |
|---|---|---|---|---|
| WWW.A.COM | 13/2/1980 | PRESENT | 222.1.33.22 | -- |
| WWW.B.COM | 23/1/1985 | PRESENT | 123.2.3.222 | -- |

FIG. 5A

| URL | STARTING DATE | ENDING DATE | IP ADDRESS | REDIRECTED URL |
|---|---|---|---|---|
| WWW.A.COM | 13/2/1980 | 1/5/1998 | 123.2.3.222 | WWW.B.COM |
| WWW.B.COM | 23/1/1985 | PRESENT | 123.2.3.222 | -- |

METHOD AND APPARATUS FOR PERSISTENT STORAGE OF WEB RESOURCES

CROSS REFERENCE TO RELATED APPLICATIONS

The present application is a continuation application of U.S. patent application Ser. No. 09/201,752 filed Dec. 01, 1998, now abandoned. The present invention is related to U.S. patent application Ser. No. 10/099,121, entitled "A Method And Apparatus For Persistent Access to Web Resources Using Relative Time-Stamps" and U.S. patent application Ser. No. 09/201,749, entitled "A Method And Apparatus For Resolving Domain Names of Persistent Web Resources," assigned to the assignee of the present invention and incorporated by reference herein.

FIELD OF THE INVENTION

The present invention relates to Internet resource access techniques, and more particularly, to a method and apparatus for ensuring persistent access to Internet resources.

BACKGROUND OF THE INVENTION

The World Wide Web (the "Web") provides a dynamic way to present and distribute a vast amount of information. Anyone who is connected to the Internet and has a browser, such as Netscape Navigator Communicator™, commercially available from Netscape Communications Corporation of Mountain View, Calif., can access information on the Web. The Web provides users with many media options and is becoming ubiquitously available in an expanding variety of personal electronic devices, far beyond its initial limited availability to users via computer terminals. In addition, as display technologies continue to improve, the Web may ultimately replace traditional paper-based media altogether.

Paper-based media generally have an associated time stamp, and permit an easy determination of the information that was available at a given time. For example, a newspaper article can be cited as an authoritative reference, provided that the particular date of the newspaper publication is specified. Due to the dynamic nature of Web content, however, a Web document is generally not a reliable reference source. Currently, Web content cannot reliably be expected to be available in the same form and addressed by the same Uniform Resource Locator ("URL") at a future time. While some Web sites may provide access to some archived Web documents, the historical Web documents may not be accessed by users in a consistent and predictable manner, if at all.

The Online Computer Library Center, Inc. ("OCLC"), a nonprofit computer library service and research organization, provides a software tool, referred to as OCLC PURL ("Persistent Uniform Resource Locator"), for managing Internet addresses and aliases for general Internet resources. A Persistent Uniform Resource Locator provides flexible naming and name resolution services for Internet resources to ensure reliable, long-term access to Internet resources with minimal maintenance. Generally, OCLC PURL assists Internet users in locating Web resources. As previously indicated, the Internet is constantly expanding and changing. Once a Uniform Resource Locator (URL) changes, all previous references to that URL become invalid, thereby preventing users from accessing the Internet resource. The management of these changes often becomes burdensome.

While a URL points directly to the location of an Internet resource, a PURL points to an intermediate resolution service, which translates the PURL into the actual URL. Once a Web resource has been registered with the OCLC and assigned a PURL, the Web resource may be accessed by means of the PURL. A PURL assigns a persistent name to a resource even if the location of the resource changes. In this manner, PURLs referenced in Web documents and other resources can remain viable over time without having to update the references each time the Web resource is moved. The PURL "forwarding" address maintained by OCLC, however, must be kept up-to-date. In other words, each time the document is moved, OCLC must be notified of the new address for the document.

SUMMARY OF THE INVENTION

Generally, a method and apparatus are disclosed for providing persistent access to Web resources. According to an aspect of the invention, the Uniform Resource Locators ("URLs") that identify Web resources are optionally augmented to include a time stamp. The time stamp can be specified in the Uniform Resource Locator ("URL") in any suitable format. A web browser and a web server are disclosed that accommodate a time stamp parameter and allow a user to refer to any Web address with a precise target time. Thus, the present invention allows the Web to be an organized and reliable reference source, much like paper-based media.

The disclosed Web browser can optionally include a mechanism to facilitate the specification of the desired date and time, or the user can manually append the time stamp to the URL indicated in the "Location" window of the browser. In one embodiment, the persistent Web server (i) receives URLs containing a time stamp, (ii) retrieves a base Web page corresponding to the requested page from the archive, (iii) modifies the base Web page to update embedded hyperlinks to incorporate the same time stamp as the requested Web page and (iv) returns the updated page as the requested page to the client. The persistent Web server interprets the extracted URL in accordance with the selected time stamp format. In addition, the persistent Web server includes a persistent archive for storing all of the versions of Web resources that will be persistently available to Web users. The present invention ensures that a time-stamped reference to any Web resource refers to the desired material. In this manner, anyone doing historical research on the Web can retrieve any information that is valid in any period of time.

DETAILED DESCRIPTION

Figure 1:
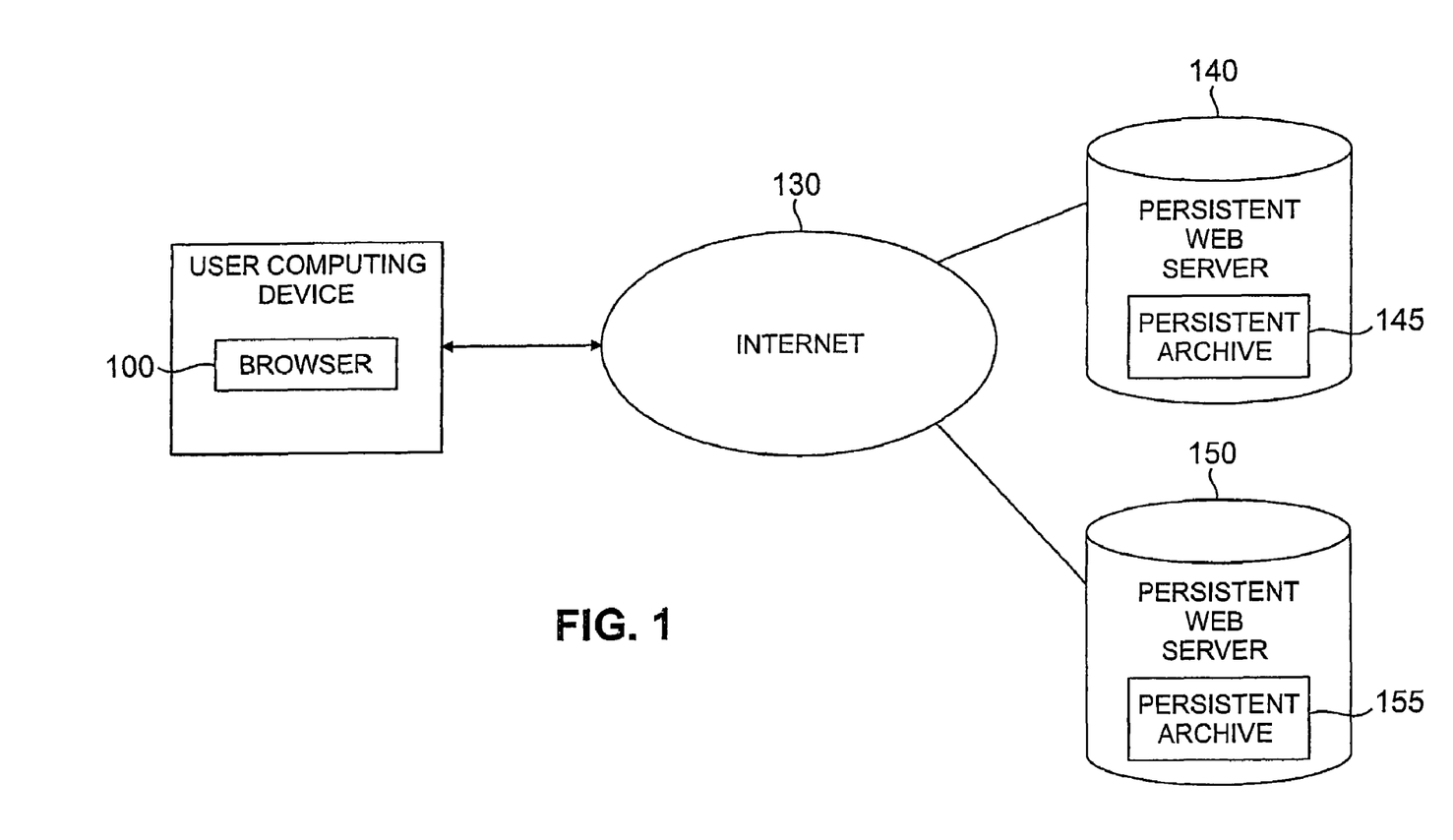
FIG. 1 illustrates an Internet or World Wide Web ("Web") environment in accordance with the present invention.

FIG. 1 illustrates a Web browser 100 in accordance with the present invention, that accesses information from one or more persistent Web servers 140, 150 over the Internet or World Wide Web ("Web") environment 130. The present invention provides persistent access to Web resources or electronic documents, including textual, audio, video or animation documents. According to a feature of the present invention, the Uniform Resource Locators ("URLs") that identify Web resources are augmented to include a time stamp. The Web browser 100 and persistent Web servers 140, 150 accommodate the additional time stamp parameter and allow a user to refer to any Web address with a precise target date. For example, the URL "http://cnn.com?time=2+2+1997" specifies the Web contents of the CNN home page on Feb. 2, 1997. In this manner, the Web can be an organized and reliable reference source, much like paper-based media.

Illustrative Time Stamp Formats

The time stamp can be included in the Uniform Resource Locator ("URL") in any suitable format, as would be apparent to a person of ordinary skill. For example, to refer to the web page, www.Lucent.com, as it existed on Feb. 2, 1998, the URL can be represented as:

http://www.lucent.com?time=2+2+1998.

In a further variation, additional time granularity can be indicated by including the time-of-day in the URL. For example, the web page, www.Lucent.com, as it existed at 1:23 p.m. on Feb. 2, 1998, the URL can be represented as:

http://www.lucent.com?time=13+23+2+2+1998.

Unless otherwise specified, the time zone is assumed to be the user's default time zone. The illustrative time stamp format described above is a Common Gateway Interface (CGI) search argument. Of course, the month, day and year (or other time units) can be expressed in any order. For a URL without a time stamp, the default value will be the most recent version.

In addition, relative time stamps can be utilized. For example, to refer to the web page, www.Lucent.com, as it existed yesterday, the URL can be represented as:

http://www.lucent.com?time=yesterday.

Furthermore, if an embedded hyperlink contains a relative time stamp, the relative time stamp is based on the current web page. Thus, if a current web page has a URL in the form:

http://www.lucent.com?time=1998_1_10 and this page contains an embedded hyperlink in the form:

http://www.lucent.com?time=yesterday

The browser and server will interpret and translate the URL as http://www.lucent.com?rtime=1998_1_9.

Other relative time stamps can include time offsets from the time of the current web page, such as plus or minus a specified period of time. For example, "+10D" can indicate plus ten days to the time of the currently viewed web page.

In order to refer to the previous or subsequent archived version of a document (relative to the time stamp of the current document), the URL can be represented using the labels "next_archive," or "previous_archive." The server will search through the archive to find the required document. For example, if a currently viewed document has a URL in the form:

http://www.lucent.com/doc.html?rtime=1997_5_12 and there are different versions of the same document archived on Jul. 2, 1997, Jun. 1, 1997, Apr. 1, 1997 and Mar. 1, 1997. The following link can be used in the current document to refer to one of these archives:

doc.html?rtime=next_archive

These relative archive time stamps make moving between different version of the same documents more efficient.

In an alternate implementation, referred to herein as the "request-header scheme," the time stamp can be indicated as one of the HTTP request headers, such as:

Time-Stamp: Jun. 9, 1998.

In another embodiment, referred to herein as the "special character scheme," special characters can be utilized to indicate the inclusion of a time stamp in the URL, such as:

http://www.cnnfn.com;time=2+2+1998&timezone=server.

Web Browser

The Web browser 100 may be embodied as a conventional browser, such as Microsoft Internet Explorer™ or Netscape Navigator™, as modified herein to incorporate the features and functions of the present invention. As discussed further below, the Web browser 100 only needs to incorporate a new options selection panel to permit the user to specify the desired date and time. In fact, a conventional Web browser 100 can be utilized, with the user manually appending the time stamp to the URL indicated in the "Location" window of the browser 100.

In one implementation, the user has the option to turn the time stamp on or off. If the time stamp is activated, the browser 100 will change the URL accordingly before sending the URL out to the Web 130. Since there is no guarantee that the corresponding web server 140, 150 recognizes a time stamp, the document returned by the server 140, 150 might contain embedded hyperlinks that do not contain time stamps. Thus, in this situation, the web browser 100 can automatically convert the URL associated with an embedded hyperlink to add an appropriate time stamp when the user clicks on the hyperlink if the time stamp option is activated. The Web browser 100 should convert the URL in accordance with the selected time stamp format. In a request-header-scheme implementation, the browser 100 should be modified to send the special request header ("Time-Stamp: Jun. 9, 1998"). In addition, the HTML should be modified to include a new time stamp tag for any embedded hyberlink with a specific time stamp. For example, for a hyperlink such as:

<A HREF="www.lucent.com">Lucent Web Site</A>
the HTML should be modified to indicate the time stamp of Feb. 2, 1998 as follows:
<A HREF="www.lucent.com"> <TIMESTAMP TIME="2+2+1998" TIMEZONE=server> </TIMESTAMP>Lucent Web Site</A>.

Persistent Web Servers

The persistent Web servers 140, 150 may be embodied as conventional hardware and software, as modified herein to carry out the functions and operations described below. Specifically, the persistent Web servers 140, 150 need to know how to (i) receive URLs containing a time stamp, (ii) extract the time stamp, (iii) retrieve the correct Web page from the archive, (iv) modify the requested Web page to update embedded hyperlinks to incorporate the same time stamp as the requested Web page and (v) return the requested page to the client. The persistent Web servers 140, 150 should interpret the extracted URL in accordance with the selected time stamp format. If a version of the Web resource corresponding to the requested time does not exist, the present invention assumes the Web resource has not changed from the previous archived version, and the version of the Web resource with the most recent time preceeding the requested time is provided.

In addition, the persistent Web servers 140, 150 need to preserve all the information in their history of serving the Web. Thus, as shown in FIG. 1, each persistent Web server, such as the servers 140, 150, includes a persistent archive 145, 155, respectively, for storing all of the versions of Web resources that will be persistently available to Web users. The persistent archives 145, 155 may be embodied as any storage device, although a persistent (non-erasable) storage device such as CD-ROM, CR-R, WORM or DVD-ROM may be preferred.

Figure 2:
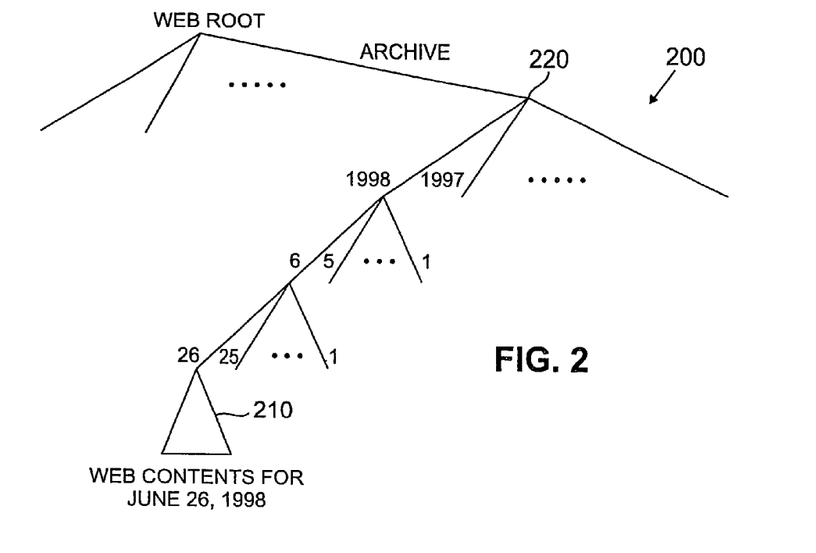
FIG. 2 illustrates a directory structure that arranges the contents of a Web site chronologically.

For the persistent Web servers 140, 150 to support dated URLs, the persistent Web servers 140, 150 need to store all of their contents in a chronicle fashion to enable the retrieval of timely information. In one implementation, shown in FIG. 2, the persistent archives 145, 155 store the entire web site contents on permanent storage devices according to some sort of chronological directory structure. FIG. 2 shows a directory structure 200 that arranges the contents of the Web site chronologically. Thus, each leaf, such as the leaf 210, in the directory structure 200 corresponds to a dated URL. For example, a dated URL such as:

http://www.nytimes.com?time=24+2+1998 is conceptually equivalent to:

http://www.nytimes.com/archive/1998/2/24/.

Of course, storing the entire web site contents is inefficient in terms of storage usage. Many Web pages exhibit few, if any, changes from day to day. Thus, significant storage efficiencies can be achieved by simply removing redundancy in the archive. Once the redundancy is removed, the storage requirement in addition to the regular web site storage is usually not very large.

Figure 3:
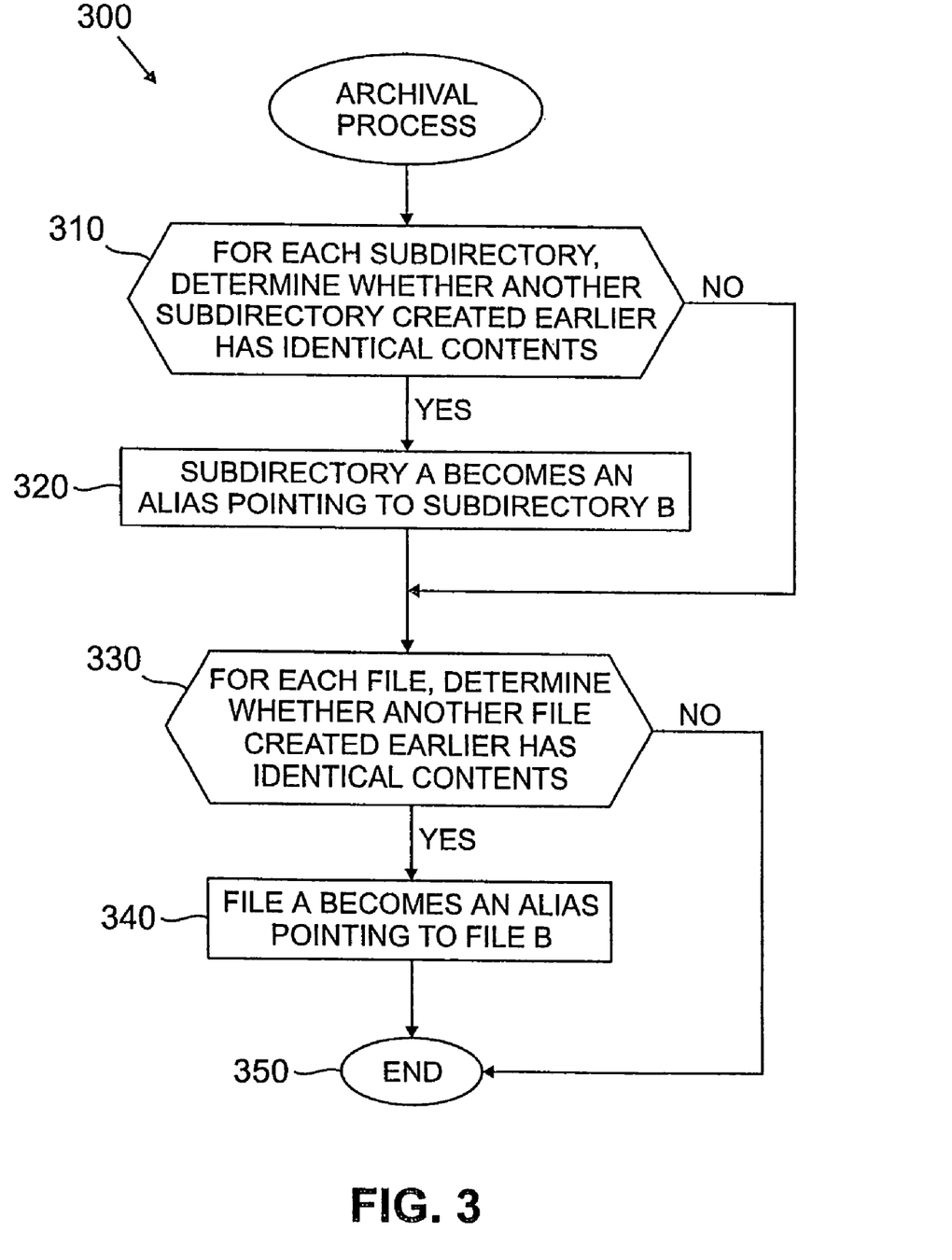
FIG. 3 is a flow chart illustrating an exemplary archival process implemented by a Web site to reduce the redundancy of a persistent archive of FIG. 1.

FIG. 3 illustrates an archival process 300 for reducing the redundancy of the persistent archive 145, 155. All the files or subdirectories mentioned in the algorithm are under the archive subdirectory 220 of the illustrative directory structure 200 of FIG. 2. As shown in FIG. 3, the archival process 300 initially performs a test during step 310 for each subdirectory, such as subdirectory A, to determine whether there exists a subdirectory B that is created earlier and has identical contents as subdirectory A. If it is determined during step 310 that there is no subdirectory B created earlier and having identical contents as subdirectory A, then it is not possible to reduce the redundancy on the subdirectory level of the persistent archive 145, 155 and program control proceeds to step 330.

Figure 4A:
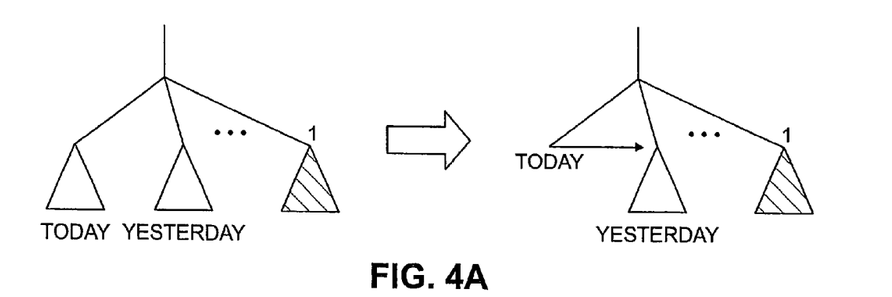
FIGS. 4A and 4B illustrate the aliasing of the contents of a Web site that is identical to previously archived contents by the archival process of FIG. 3.
Figure 4B:
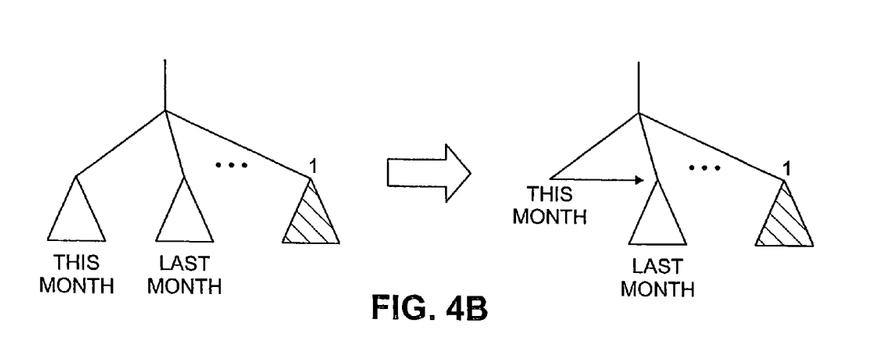

If, however, it is determined during step 310 that there exists a subdirectory B that is created earlier and has identical contents as subdirectory A, then subdirectory A becomes an alias during step 320 pointing to subdirectory B. For example, as shown in FIG. 4A, if the current contents of a Web site is identical to the contents of the previous day, an alias is created for today pointing to yesterday's subdirectory. Likewise, as shown in FIG. 4B, if the current month's content is the same as the contents of the previous month, an alias is created for this month pointing to last month's subdirectory.

Thereafter, a test is performed during step 330 for each file, such as file A, to determine whether there exists a file B that is created earlier and has identical contents as file A. If it is determined during step 330 that there is no file B created earlier and having identical contents as file A, then it is not possible to reduce the redundancy of the persistent archive 145, 155 on the file level. Thus, program control terminates during step 350.

If, however, it is determined during step 330 that there exists a file B that is created earlier and has identical contents as file A, then file A becomes an alias during step 340 pointing to file B. Thereafter, program control terminates during step 350.

The archival process 300 may be impractical, since it needs to search for match files or directories. The run time increases exponentially with the number of entities in the archive. Many sub-optimal solutions are possible, as would be apparent to a person of ordinary skill in the art. A very simple solution is just checking what you want to archive today against the most recently added archive (like yesterday's contents). Since most of the web sites only differ from their previous archived ones slightly, this approach is quite reasonable. This approach is similar to the well-known incremental backup of a file system.

If a Web server is not persistent, it should only have minimal impact. In one embodiment, if a request includes a time stamp that is not recognized by a Web server, the server should deliver the most recent version of the requested Web resource.

Another way to reduce storage requirements of the persistent archive is to make the Web server smarter in terms of searching the correct archived data. For example, persistent storage of a web resource can be limited to versions that have some difference relative to previously saved versions of the web resource. For example, if an illustrative archive contains the following five different versions of a web resource: Jun. 4, 1996, Jun. 12, 1996, Mar. 23, 1997, Feb. 1, 1998 and Feb. 3, 1998, the web server assumes that if the requested date does not equal any of the archived versions, then the requested date is identical to the version with the closest earlier date. In addition, a special symbolic link (or alias on MacOS, short cut on MS Windows) can be used in a directory to represent where to looks for files or directories that are not found under the current directory. In this manner, only the changed parts are stored under appropriate directories. All the unchanged data can be referred through a chain of such special links.

DNS Server

The domain name server (DNS) may be embodied as conventional hardware and software, as modified herein to carry out the functions and operations described below. Conventional DNS servers will reject any domain name reference which is not in the DNS database. One benefit of dated URL in accordance with the present invention is that it can be used to refer to historical Web resources. For example, if company A is merged into company B, all the web pages referred through "www.A.com" may no longer be valid. For users who want to access some documents from company A, they need to change all the reference to some place in company B's web site.

Figure 5A:
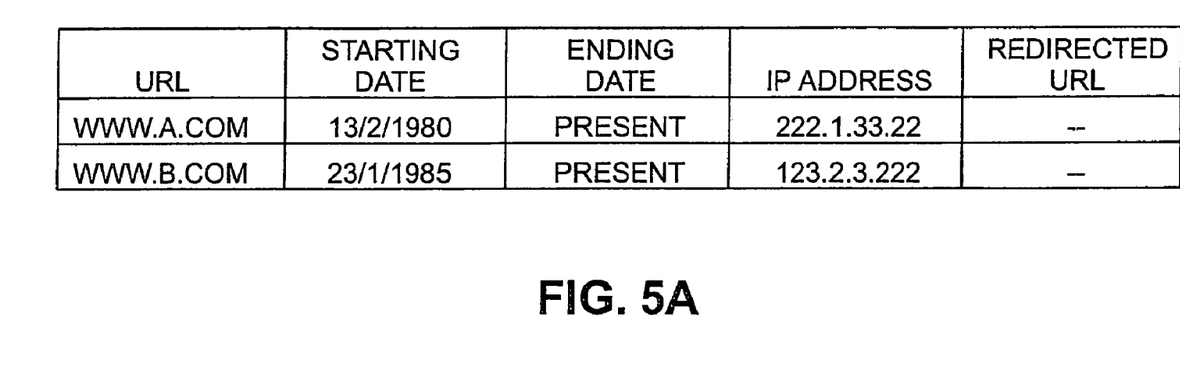
FIGS. 5A and 5B are a sample table of a DNS server database in accordance with the present invention.
Figure 5B:
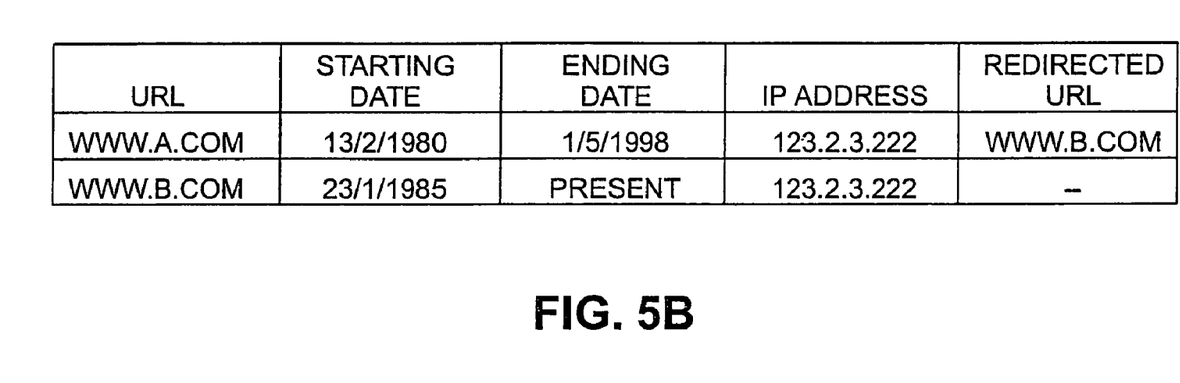

The historical information of company A can still be accessed if the DNS server does not reject the name reference, but instead consults an archive service company that knows where the historical information of company A is located. The DNS server itself can also store some historical data to resolve the name to IP address process faster. FIGS. 5A and 5B provide examples of data stored in a DNS server database before and after the merger of companies A and B, respectively. As shown in FIG. 5B, if a user wants to find www.A.com after the merger, the DNS server has enough information to redirect the user's request to a new IP address associated with company B. The dates listed in the database are the valid periods for the corresponding domain name. Thus, a dated domain name reference like "www.A.com Feb. 2, 1999" is invalid, while "www.A.com Feb. 2, 1992" is valid.

Figure 6:
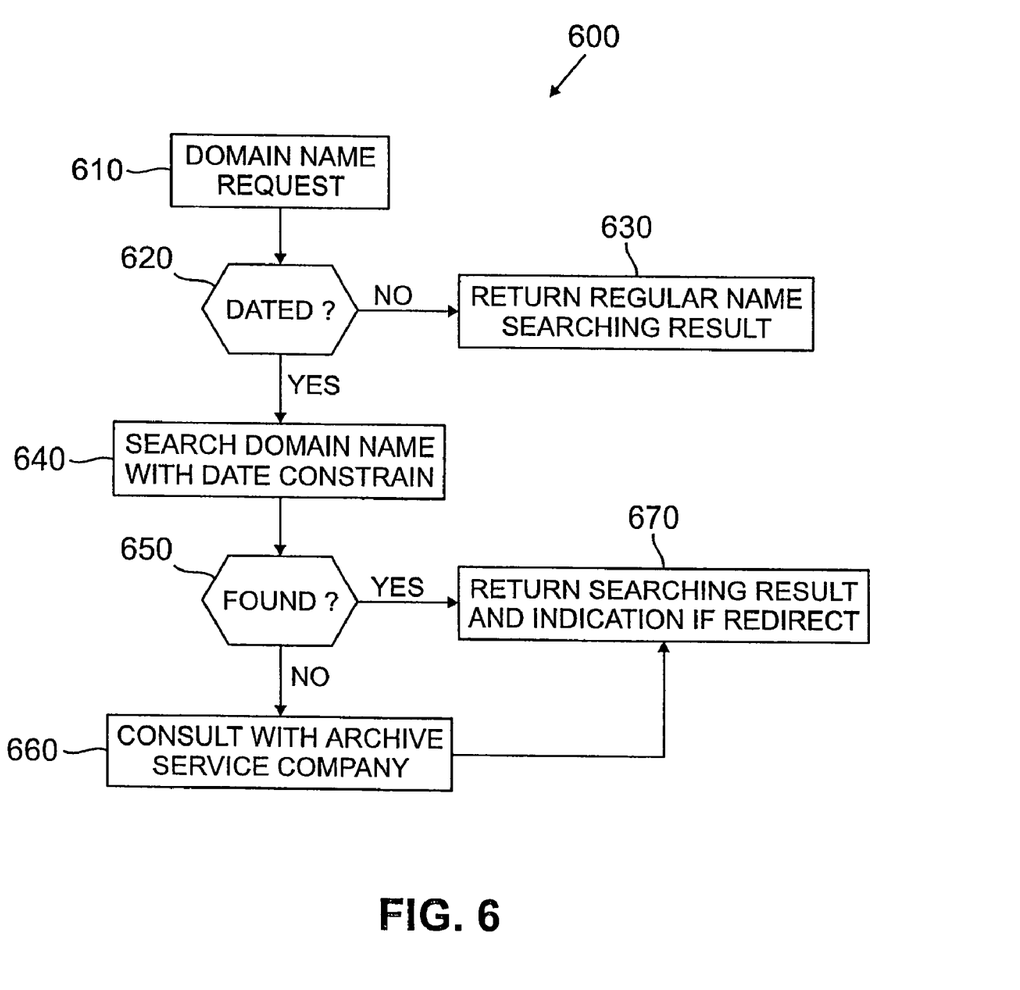
FIG. 6 is a flow chart describing an exemplary DNS server process performed by a DNS server to determine the IP address corresponding to a time-stamped URL.

FIG. 6 illustrates a DNS server process 600 in accordance with the present invention. As shown in FIG. 6, the DNS server process 600 initially receives a domain name request during step 610. A test is performed during step 620 to determine if the domain name request is dated. If it is determined during step 620 that the domain name request is not dated, the regular name searching result is returned during step 630.

If, however, it is determined during step 620 that the domain name request is dated, the DNS server process 600 searches the DNS database for the domain name with the date constraint during step 640. A further test is performed during step 650 to determine if the dated domain name is found. If it is determined during step 650 that the dated domain name is not found, then the DNS server consults with an archive service company during step 660 for further searching before program control proceeds to step 670.

If, however, it is determined during step 650 that the dated domain name is not found, then the searching result and indication, if redirect, are returned during step 670, before program control terminates.

After the domain name is resolved by the DNS server, the Web browser 100 needs to send the request to the web server 140, 150 according to what is returned from the DNS server. For example, a request from the user for the following URL, "http://www.A.com?time=2+2+1992," will cause the browser 100 to send a domain name resolving request to the DNS server in a format such as "www.A.com Feb. 2, 1992." Since company A is now part of company B, the results will look like "123.2.3.222 redirect." The Web browser 100 now has the IP address of the server and also knows it is a redirect one. Thus, the Web browser 100 will effectively send a request to the Web server 140, 150 of Company B in a form such as "http://123.2.3.222?http://www.A.com&time=2+2+1992." The Web server 140, 150 of Company B will know how to map this old address of company A's to the appropriate place and get the correct information.

One side benefit of this new DNS server is that some names can be reused once they are history. For example, another company named Company A can utilize the www.A.com domain name after a predefined period, by updating the DNS database with the following entries:

| URL | STARTING DATE | ENDING DATE | IP ADDRESS | REDIRECTED URL |
|---|---|---|---|---|
| WWW.A.COM | 13/2/1980 | 1/5/1998 | 123.2.3.222 | WWW.B.COM |
| WWW.A.COM | 1/1/2000 | PRESENT | 234.2.2.12 | — |
| WWW.B.COM | 23/1/1985 | PRESENT | 123.2.3.222 | — |

In this manner, domain names can be reused without wasting them forever.

Persistent Access to Dynamic Web Content

The Web is now full of dynamic content, including real time video, for example, from a WebCam, and audio streams, for example, from a WebCast event, as well as Java, Javascript or Active-X enabled web pages. Depending on the application, it may not be necessary or desirable to archive the continuous dynamic content. In addition, it may not be necessary or desirable to archive all the advertising portions of a web pages.

For chronological data, such as bank or stock broker transactions, it is easy to extract part of the record for a given time stamp restriction. For example, to check the account balance of a give date, the browser 100 can send a request in the form:
    http://bank.com/?id=12345&time=2+3+1998.

The server 140, 150 only needs to retrieve or recalculate the data up to Mar. 2, 1998 and return the results. Since all the transactions in such application environments have time stamps anyway, it is straightforward to add this function to the service.

For real time contents, the only restriction in appending a time stamp is the storage requirement. If a lot of storage space is available compared to the amount of information to be archived, the Web site administrator can choose to archive the real time contents or to archive some of them such as one day, one week or one year's worth of data.

For dynamically created advertisements, the Web site administrator must decide whether it is reasonable to 'reshow' the old advertisement (for some special reason) or whether the old advertisement can be replaced with a new, up-to-date commercial which is not relevant to the 'real' archived web contents.

For a dynamically executed script on a Web page, there are two possible situations. If the script is not related to any time function, then the script can be archived safely. If, however, the script will change its behavior according to some time function, such as a clock or calendar display, then the script needs to be modified to deal with dated URL, requiring modifications to Java, Javascript or Active-X standards, as appropriate. Web pages generated dynamically by CGI applications are treated in a similar manner.

An article of manufacture for accessing an electronic document, said article of manufacture comprising a computer readable medium having computer readable program code means embodied thereon, said computer readable program code means comprising program code means for causing a computer to obtain one of said versions of said electronic document identified by a creation time stamp based on a requested time stamp; and update, in response to a received user request for said electronic document, one or more embedded hyperlinks in said obtained version of said electronic document to include a time stamp based on the requested time stamp, wherein said user request includes said requested time stamp.

It is to be understood that the embodiments and variations shown and described herein are merely illustrative of the principles of this invention and that various modifications may be implemented by those skilled in the art without departing from the scope and spirit of the invention.

I claim:

1. A method for persistent storage of an electronic document, said electronic document having multiple versions, said method comprising the steps of:
    obtaining one of said versions of said electronic document identified by a creation time stamp based on a requested time stamp; and
    updating, in response to a received user request for said electronic document, one or more embedded hyperlinks in said obtained version of said electronic document to include a time stamp based on the requested time stamp, wherein said user request includes said requested time stamp.

2. The method of claim 1, wherein at least one of said one or more updated embedded hyperlinks points to a version of a linked electronic document with a most recent time stamp preceding the requested time stamp if a version of said linked electronic document does not exist with the requested time stamp.

3. The method according to claim 1, wherein said obtained version of said electronic document is selected utilizing said requested time stamp.

4. The method according to claim 1, wherein said included time stamp based on said creation time stamp of said obtained version of said electronic document.

5. The method according to claim 1, further comprising the step of transmitting said updated version of said electronic document to a client.

6. The method according to claim 1, further comprising the step of storing a pointer to a previous version of said electronic document if said previous version of said electronic document is substantially identical.

7. The method according to claim 1, wherein an address identifying said electronic document includes said requested time stamp.

8. The method according to claim 7, wherein said address is a Uniform Resource Locator ("URL").

9. The method according to claim 8, wherein said Uniform Resource Locator ("URL") has an associated request header for indicating said requested time stamp.

10. The method according to claim 1, wherein said obtaining step obtains a version of said electronic document with the most recent time stamp preceding the requested time stamp if a version of said electronic document does not exist with the requested time stamp.

11. The method according to claim 1, wherein said requested time stamp is specified using a browser.

12. The method according to claim 1, wherein said requested time stamp is a relative time stamp.

13. A system for storing an electronic document having multiple versions, said system comprising:
   a memory for storing said multiple versions of said electronic document in an archive of electronic documents; and
   a processor operatively coupled to said memory, said processor configured to:
   obtain one of said versions of said electronic document identified by a creation time stamp based on a requested time stamp; and
   update, in response to a received user request for said electronic document, one or more embedded hyperlinks in said obtained version of said electronic document to include a time stamp based on the requested time stamp, wherein said user request includes said requested time stamp.

14. The system according to claim 13, wherein at least one of said one or more updated embedded hyperlinks points to a version of a linked electronic document with a most recent time stamp preceding the requested time stamp if a version of said linked electronic document does not exist with the requested time stamp.

15. The system according to claim 13, wherein said obtained version of said electronic document is selected utilizing said requested time stamp.

16. The system according to claim 13, wherein said included time stamp based on said creation time stamp of said obtained version of said electronic document.

17. The system according to claim 13, wherein said processor is further configured to transmit said updated version of said electronic document to a client.

18. The system according to claim 13, wherein said processor is further configured to store a pointer to a previous version of said electronic document if said previous version of said electronic document is substantially identical.

19. The system according to claim 13, wherein an address identifying said electronic document includes said requested time stamp.

20. The system according to claim 19, wherein said address is a Uniform Resource Locator ("URE").

21. The system according to claim 20, wherein said Uniform Resource Locator ("URL") has an associated request header for indicating said requested time stamp.

22. The system according to claim 13, wherein said processor is further configured to obtain a version of said electronic document with the most recent time stamp preceding the requested time stamp if a version of said electronic document does not exist with the requested time stamp.

23. The system according to claim 13, wherein said requested time stamp is specified using a browser.

24. The system according to claim 13, wherein said requested time stamp is a relative time stamp.

25. An article of manufacture for accessing an electronic document, said article of manufacture comprising:
   a computer readable medium having computer readable program code means embodied thereon, said computer readable program code means comprising program code means for causing a computer to:
   obtain one of said versions of said electronic document identified by a creation time stamp based on a requested time stamp; and
   update, in response to a received user request for said electronic document, one or more embedded hyperlinks in said obtained version of said electronic document to include a time stamp based on the requested time stamp, wherein said user request includes said requested timestamp.

* * * * *

UNITED STATES PATENT AND TRADEMARK OFFICE
CERTIFICATE OF CORRECTION

PATENT NO. : 7,418,655 B2 Page 1 of 1
APPLICATION NO. : 11/014342
DATED : August 26, 2008
INVENTOR(S) : Ong It is certified that error appears in the above-identified patent and that said Letters Patent is hereby corrected as shown below:

In the specification, column 4, line 47, after "embedded" and before "with" replace "hyberlink" with --hyperlink--.

Column 6, line 39, after "where to" and before "for files" replace "looks" with --look--.

In claim 20, column 10, line 22, after "Uniform Resource Locator" replace "("URE")" with --("URL")--.

Signed and Sealed this

Thirteenth Day of January, 2009

JON W. DUDAS
*Director of the United States Patent and Trademark Office*